United States Patent
Katzur et al.

(10) Patent No.: US 8,379,728 B2
(45) Date of Patent: Feb. 19, 2013

(54) ADAPTIVE REAL-TIME VIDEO PREDICTION MODE METHOD AND COMPUTER-READABLE MEDIUM AND PROCESSOR FOR STORAGE AND EXECUTION THEREOF

(75) Inventors: Ran Katzur, North Potomac, MD (US); David Quintin Bell, Frederick, MD (US)

(73) Assignee: Texas Instruments Incorporated, Dallas, TX (US)

( * ) Notice: Subject to any disclaimer, the term of this patent is extended or adjusted under 35 U.S.C. 154(b) by 462 days.

(21) Appl. No.: 12/732,554

(22) Filed: Mar. 26, 2010

(65) Prior Publication Data
US 2010/0266045 A1 Oct. 21, 2010

Related U.S. Application Data

(60) Provisional application No. 61/170,393, filed on Apr. 17, 2009.

(51) Int. Cl.
*H04N 7/12* (2006.01)
(52) U.S. Cl. .................................. 375/240.16
(58) Field of Classification Search ............. 375/240.16, 375/240.24, 240.2
See application file for complete search history.

(56) References Cited

U.S. PATENT DOCUMENTS

| | | | |
|---|---|---|---|
| 6,687,299 B2 | 2/2004 | Yoshida et al. | |
| 6,748,019 B1 * | 6/2004 | Lin et al. | 375/240.24 |
| 6,870,956 B2 | 3/2005 | Qi et al. | |
| 7,113,640 B2 | 9/2006 | Qi et al. | |
| 7,116,716 B2 | 10/2006 | Ma et al. | |
| 7,127,120 B2 | 10/2006 | Hua et al. | |
| 7,164,798 B2 | 1/2007 | Hua et al. | |
| 7,260,261 B2 | 8/2007 | Xie et al. | |
| 7,274,741 B2 | 9/2007 | Ma et al. | |
| 7,379,607 B2 | 5/2008 | Srinivasan et al. | |
| 7,400,761 B2 | 7/2008 | Ma et al. | |

(Continued)

OTHER PUBLICATIONS

U.S. Appl. No. 11/739,462, filed Apr. 24, 2007, Madumbu.

(Continued)

*Primary Examiner* — Mehrdad Dastouri
*Assistant Examiner* — Mohammed Rahaman
(74) *Attorney, Agent, or Firm* — Steven A. Shaw; W. James Brady; Frederick J. Telecky, Jr.

(57) ABSTRACT

A method of determining an adaptive early skip indication (ESI) threshold during block motion compensation encoding of digital video data is disclosed. The method includes setting an ESI threshold minimum value below which no degradation in the block motion compensation encoding occurs; setting an ESI threshold maximum value above which degradation in the block motion compensation encoding is considered unacceptable; determining that a processor load state of the processor during block motion compensation encoding is one of an overloaded state, a normal loaded state, and an under loaded state; when the processor load state is determined to be in an overloaded state, increasing the adaptive ESI threshold to a value below the ESI threshold maximum value thereby decreasing a number of macroblocks in the digital video data that are block motion compensation encoded; when the processor load state is determined to be in a normal loaded state, maintaining the adaptive ESI threshold at its current value; and when the processor load state is determined to be in an under loaded state, decreasing the adaptive ESI threshold to a value above the ESI threshold minimum value thereby increasing a number of macroblocks in the digital video data that are block motion compensation encoded. A block motion compensation encoding devices is also disclosed that implements the method above. A computer readable medium is also disclosed that stores instructions, which when executed by a processing unit, performs the method above.

14 Claims, 4 Drawing Sheets

U.S. PATENT DOCUMENTS

| | | | |
|---|---|---|---|
| 7,444,018 B2 | 10/2008 | Qi et al. | |
| 7,471,827 B2 | 12/2008 | Xie et al. | |
| 2001/0046263 A1* | 11/2001 | Yamada et al. | 375/240.12 |
| 2003/0007563 A1* | 1/2003 | Ryu | 375/240.13 |
| 2003/0133169 A1* | 7/2003 | Uchibayashi et al. | 358/426.07 |
| 2006/0120458 A1* | 6/2006 | Kodama et al. | 375/240.16 |
| 2007/0274396 A1* | 11/2007 | Zhang et al. | 375/240.24 |
| 2008/0159397 A1* | 7/2008 | Kawashima et al. | 375/240.16 |

OTHER PUBLICATIONS

U.S. Appl. No. 60/746,931, filed May 10, 2006, Madumbu.
U.S. Appl. No. 60/170,393, filed Apr. 17, 2009, Katzur.

* cited by examiner

ADAPTIVE REAL-TIME VIDEO PREDICTION MODE METHOD AND COMPUTER-READABLE MEDIUM AND PROCESSOR FOR STORAGE AND EXECUTION THEREOF

CROSS-REFERENCE TO RELATED APPLICATIONS

This application claims the benefit of Provisional U.S. Application 61/170,393, filed Apr. 17, 2009, and is expressly incorporated herein by reference.

TECHNICAL FIELD

The technical field relates in general to real-time digital video signal processing. More particularly, the technical field relates to real-time video block motion compensation encoding.

BACKGROUND

Multiple applications for real-time digital video communication and multiple international standards for video coding have been, and are continuing to be, developed. Low bit rate communications, such as video telephony and conferencing for example, led to the International Telecommunication Union Standardization Sector (ITU-T) H.261 standard, which offered data rates as multiples of 64 kbps. The Motion Picture Expert Group's first standard (MPEG-1) was developed which provided picture quality comparable to that of VHS videotape. Subsequently, the 11.263, MPEG-2, and MPEG-4 standards have been promulgated.

The ITU-T H.264 is a recent coding standard that makes use of several coding tools to provide better compression performance than the existing standards described above. The ITU-T H.264 standard was jointly developed with the Advanced Video Coding (AVC) standard developed by the Motion Picture Expert Group and they are jointly maintained so that they have identical technical content. At the core of these standards is the hybrid video coding technique of block motion compensation (prediction) encoding plus transform coding of prediction error. Block motion compensation is used to remove temporal redundancy between successive pictures (frames or fields) by prediction from prior pictures, whereas transform coding is used to remove spatial redundancy within each block of both temporal and spatial prediction errors.

Traditional block motion compensation schemes basically assume that between successive pictures an object in a scene undergoes a displacement in the x- and y-directions and these displacements define the components of a motion vector. Thus an object in one picture can be predicted from the object in a prior picture by using the object's motion vector. Block motion compensation partitions a picture into blocks, treats each block as an object, and then determines its motion vector which locates the most-similar block in a prior picture. This is known as motion estimation.

In practice, this simple assumption works out satisfactorily in most cases. Block motion compensation has thus become the most widely used technique for temporal redundancy removal in video coding standards. It should be noted that periodically, pictures coded without motion compensation are inserted to avoid error propagation. These blocks encoded without motion compensation are called intra-coded, whereas blocks encoded with motion compensation are called inter-coded.

Block motion compensation methods typically decompose a picture into macroblocks where each macroblock contains four 8×8 luminance (Y) blocks plus two 8×8 chrominance (Cb and Cr or U and V) blocks. In the H.264/AVC standard, other block sizes are also used, such as 4×4. The residual (prediction error) block can then be encoded through block transformation, transform coefficient quantization, and entropy encoding. The transform of a block converts the pixel values of a block from the spatial domain into a frequency domain for quantization. This process takes advantage of de-correlation and energy compaction of transforms such as the two-dimensional discrete cosine transform (DCT) or an integer transform approximating a DCT.

Although intra-coded pictures are not encoded with motion compensation, spatial prediction for blocks in the pictures may be performed by extrapolation from already encoded portions of the picture. Typically, pictures are encoded in raster scan order of blocks, so pixels of blocks above and to the left of a current block can be used for intra prediction. Again, transformation of the prediction errors for a block can remove spatial correlations and enhance coding efficiency.

The H.264/AVC standard thus specifies several prediction modes for both inter-prediction and intra-prediction. These prediction modes include:

B_Direct:
Inter prediction applied, but no motion information is coded.
Inter_16×16:
Inter prediction applied for the whole macroblock (16×16).
Inter_16×8:
Macroblock partitioned into two 16×8 blocks; inter prediction applied to each block.
Inter_8×16:
Macroblock partitioned into two 8×16 blocks; inter prediction applied to each block.
Inter_8×8:
Macroblock partitioned into four 8×8 sub-macroblock, each sub-macroblock being partitioned into 8×4, 4×8, 4×4, or remain 8×8; inter prediction applied to each sub-macroblock.
B_Direct/P_Skip:
Inter prediction applied; neither motion information nor residual data are coded; simple repetition of macroblock of prior frame.
Intra_16×16:
Intra prediction applied for the whole macroblock (16×16)
Intra_4×4:
Macroblock partitioned into sixteen 4×4 blocks; intra prediction applied to each block
I-PCM
Macroblock sample coded without any transformation or compression The computational complexity for selecting the optimal prediction mode is a problem for devices encoding according to the H.264/AVC standard, and can put a stain on processing. Real-time systems such as video streaming must be able to encode a nominal number of frames per second and sustain this rate of processing. Embodiments of the present application are directed toward resolving the processing strain in encoding devices using block motion compensation encoding.

BRIEF SUMMARY

Accordingly, an embodiment disclosed in the present application is directed toward a method of determining an adaptive early skip indication (ESI) threshold during block motion compensation encoding of digital video data. The method is implemented on an encoding device configured with a processor for performing the block motion compensation encoding. The method comprises setting an ESI threshold minimum value below which no degradation in the block motion compensation encoding occur; setting an PSI threshold maximum value above which degradation in the block motion compensation encoding is considered unacceptable; determining that a processor load state of the processor during block motion compensation encoding is one of an overloaded state, a normal loaded state, and an under loaded state; when the processor load state is determined to be in an overloaded state, increasing the adaptive PSI threshold to a value below the PSI threshold maximum value thereby decreasing a number of macroblocks in the digital video data that are block motion compensation encoded; when the processor load state is determined to be in a normal loaded state, maintaining the adaptive ESI threshold at its current value; and when the processor load state is determined to be in an under loaded state, decreasing the adaptive ESI threshold to a value above the PSI threshold minimum value thereby increasing a number of macroblocks in the digital video data that are block motion compensation encoded.

Another embodiment of the present application is directed toward a computer readable medium with instructions stored thereon, the instructions when executed performing the method summarized above of determining an adaptive PSI threshold during block motion compensation encoding of digital video data. A final embodiment of present application is directed toward a processing unit including an input portion, a processor, and output portion. The input portion accepts as input digital video data. The processor performs block motion compensation encoding on the digital video data accepted by the input portion, and determines an adaptive ESI threshold according to the method of determining an adaptive ESI threshold summarized above.

It should be noted that the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

The instant disclosure is provided to explain in an enabling fashion the best modes of performing one or more embodiments disclosed herein. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

U.S. Provisional Application No. 60/746,931, which was incorporated in non-provisional U.S. patent application Ser. No. 11/739,462 filed Apr. 24, 2007, and is incorporated herein by reference, suggests a method to perform an early skip indication for any macroblock during block motion compensation encoding. The method calculates the distance between a processed macroblock and a predicted macroblock using a sum of absolute differences (SAD) or sum of square differences (SSD) norm. If the distance norm is less than a threshold then the processed macroblock is declared to be a skipped macroblock.

Skipped macroblocks affect real-time video compression systems in two ways. Initially, a skipped macroblock requires fewer bits in the compression scheme. Secondly, a skipped macroblock needs much less processing than other macroblocks.

Real-time systems are usually constant bit rate systems, meaning that the number of bits that is available for the compressed video is fixed. Since a skipped macroblock requires fewer bits to encode, more bits are free to be used by other macroblocks. In this way, the quantization error of other macroblocks is reduced.

As indicated above, a skipped macroblock requires far less processing power than a normal macroblock. An early skip method for processing macroblocks may result in reduction of the processing load on the real-time processor by regulating the timing of a decision to skip macroblocks. However, regulating the number of skipped macroblocks would logically also effect processor load.

In this regard, it should be noted that the number of skipped macroblocks in an image depends on the value of the threshold that is used to measure the distance between processed macroblock and predicted reference macroblock as the first step of encoder processing. This threshold is referred to as an early skip indicator threshold, or "ESI threshold." If an ESI threshold is a large number, more macroblocks will be declared to be skipped macroblocks. This will in turn result in a lower processor load.

Although a large ESI threshold results a lower processor load, a large ESI threshold also results in a greater degradation of image quality. This is because skipped macroblocks are constructed in the decoder as the predicted reference macroblock. If the processed macroblock is not close enough to the predicted reference macroblock, the reconstructed macroblock will not be close to the original processed macroblock. However, if the processed macroblock is close enough to the reference macroblock such that the quantized transform values of the difference between the processed macroblock and the reference macroblock are all zero, defining the macroblock as a skipped macroblock does not result in any degradation of the quality compared to full encoder processing of the macroblock.

Novel embodiments disclosed herein adaptively determine an ESI threshold ("an adaptive ESI threshold") as a function of the processor load to ensure a minimum degradation of the encoder quality while simultaneously keeping up with real-time processing. Logically, since the adaptive ESI threshold is a function of processor load, determining processor load is necessarily required. There are two ways of determining processor load disclosed herein.

Figure 1:
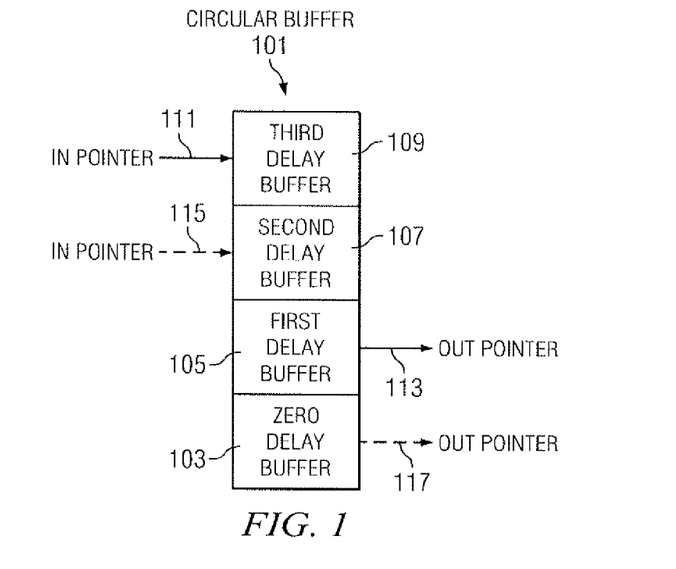
FIG. 1 is a block diagram of a circular buffer in determining a processor load state.

Referring now to FIG. 1, a block diagram of a circular buffer 101 used in determining processor load is discussed and described. Digital video data in Y—Cb—Cr format is streamed into a set of delay buffers 103, 105, 107, 109 organized as a circular buffer 101. Each delay buffer is large enough to store digital Y-Cb-Cr data of a complete frame. The rate of the video stream depends on the application and is typically either 30 or 60 frames per seconds. While the input digital video data is streamed into a single delay buffer from among the set of delay buffers 103, 105, 107, 109, the processor processes data that resides in a previously filled delay buffer.

For example, at the same time that digital video data stored in the zero delay buffer 103 is processed by the processor (as indicated by the out pointer 117), digital video data is streamed into the second delay buffer 107 (as indicated by the in pointer 115). Subsequently when digital video data stored in the first delay buffer 105 is processed by the processor (as indicated by the out pointer 113), digital video data is streamed into the third delay buffer 109 (as indicated by the in pointer 111). Logically, when digital video data stored in the second delay buffer 107 is processed by the processor, digital video data is streamed into the zero delay buffer 103. It should be noted that a circular buffer larger than four individual delay buffers may be used in an implementation of disclosed embodiments. The circular buffer 101 described herein merely serves as an easily described example.

In the example above, at the beginning of the encoder process, the processor would have delayed processing of digital video data in the individual delay buffers until a threshold two complete frames had been streamed into and stored in the circular buffer 101. As the digital video data streams into the second delay buffer 107, processing begins on the digital video data in the zero delay buffer 103. As it turns out, delay of two frames in the processing adds about 33 milliseconds delay time for 60 frames per second, or about 66 milliseconds delay time for the case of 30 frames per second.

When digital video data is streamed into the circular buffer 101 at 60 frames per second, the time required to fill each individual delay buffer is 16.4 ms. When digital video data is streamed into the circular buffer 101 at 30 frames per second, the time required to fill each individual delay buffer is 32.8 ms. Restating this, the time between input frames is either 16.4 ins or 32.8 ms.

When a digital signal processor (DSP) load is too high, the time required to process a frame stored in an individual delay buffer is greater than the 16.4 or 32.8 ins required to stream data into a different individual delay buffer. Thus, when a DSP load is too high, the number of frames stored but unprocessed will increase. When a total number of frames stored in the circular buffer 101 is greater than a threshold number of frames (for example, two as described above), a processor load state is determined to be, and set as, "overloaded." As well, when the processor load is too high, the difference between the individual delay buffer into which digital data is being streamed and the individual delay buffer that is being processed will also increase. For example, ordinarily second delay buffer 115 minus zero delay buffer 103 equals two (2). However, when the load is high, and streaming is delayed to the third delay buffer 109, the difference of the third delay buffer 109 minus the zero delay buffer 103 equals three (3).

Contrary to the above, when a DSP load is too low, the time required to process a frame stored in an individual delay is less than the 16.4 or 32.8 ms required to stream data into a different individual delay buffer. Thus, when a DSP load is too low, the number of frames stored but unprocessed will decrease. When a total number of frames stored in the circular buffer 101 is less than the threshold number of frames (for example, two as described above), a processor load state is determined to be, and set as, "under loaded." It should be noted as well, that when the processor load is too low, the difference between the individual delay buffer into which digital data is being streamed and the individual delay buffer that is being processed will also decrease.

A third possibility is that the DSP load is normal. When a DSP load is normal, the time required to process a frame stored in an individual delay is approximately equal to the 16.4 or 32.8 ms required to stream data into a different individual delay buffer. Thus, when a DSP load is normal, the number of frames stored but unprocessed stays about the same. When a total number of frames stored in the circular buffer 101 is equal to the threshold number of frames (for example, two as described above), a processor load state is determined to be, and set as, "normal loaded." It should be noted as well, that when the processor load is about normal, the difference between the individual delay buffer into which digital data is being streamed and the individual delay buffer that is being processed stays approximately the same.

To summarize, based on the amount of delay between incoming stream data and processed data in the circular buffer 101, the encoder system has three states. In the example of FIG. 1, a normal operation state would be when the system maintains two delay buffers between the input stream data and the processed data. In that case no adjustment to the system performances is needed. The second state would be an overloaded state where it takes more than 16.4 or 32.8 milliseconds to process a frame. In the second state the system will eventually increase its delay from two delay buffers to three delay buffers and the number of stored buffers in the circular buffer 101 will increase to three. The third state is the under-load state where it takes less than 16.4 or 32.8 milliseconds to process a frame. In the third state the system will eventually decrease its delay from two delay buffers to a single delay buffer and the number of stored buffers in the circular buffer 101 will decrease to one. Thus by comparing the number of individual delay buffers in which digital video data is stored with a threshold number of delay buffers, it is possible to determine whether the processor state is overloaded, under loaded, or normal loaded.

Figure 2:
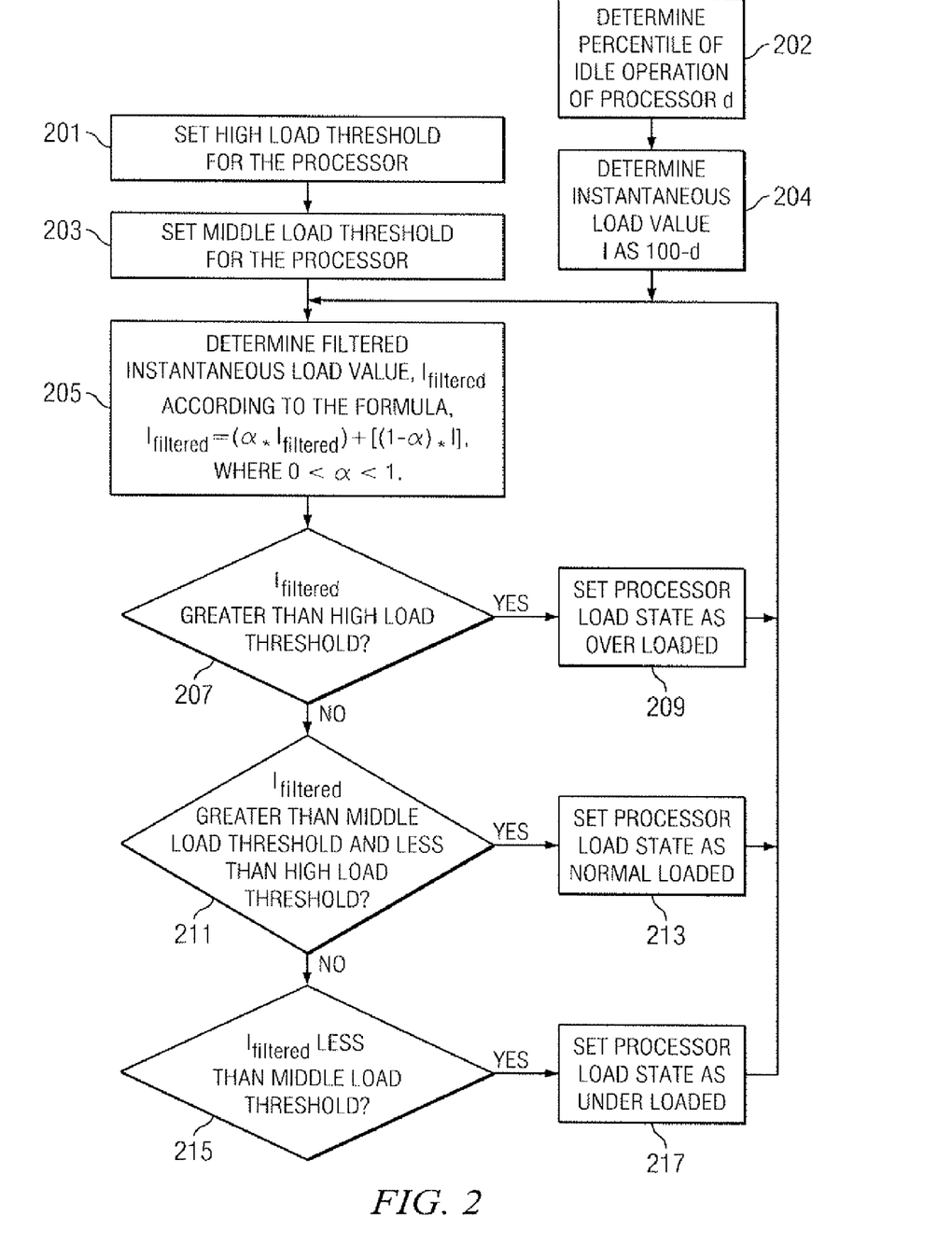
FIG. 2 is a flow chart of steps used in determining a processor load state.

Referring now to FIG. 2, a flow chart of steps for determining a processor load state is discussed and described. It is common for many DSP types and other CPU to have a mechanism that assesses the amount of idle time during processing. An instantaneous load value of the processor can be measured based on the assessed idle time.

In this regard, at 202 a percentile of idle operation d of a processor is determined. It can be assumed that the percentile of idle operation d is reset every time it is read. At 204, an instantaneous load value I is determined according to the formula, I=100−d. Determinations of the instantaneous load value I are continuous while digital video data is being encoded.

A smoothed instantaneous load value is determined by passing measurements of the instantaneous load value I through a low-pass filter. Thus at 205, $I_{filtered}$ is determined according to the formula: $I_{filtered}=(\alpha*I_{filtered})+[(1-\alpha)*I]$ where $0<\alpha<1$. Exemplary values of $\alpha$ include $7/8$, $15/16$, $13/16$ and $3/4$.

In order to use the filtered instantaneous load $I_{filtered}$ in determining processor load state, two water marks or thresholds are used: a high load threshold and a middle low threshold. Thus, at 201 a high load threshold is set, and at 203 a middle load threshold is set. As one might surmise, the high load threshold represents a level of processor activity that is greater than the level of processor activity associated with the middle load threshold. For optimal utilization of the processor capabilities, it is suggested that high load threshold value be in the range 95-99 percentile, and the middle load threshold value be in the range 85-95 percentile.

When the two watermarks are set, the processor load state can be determined by comparing the filtered instantaneous load $I_{filtered}$ with the watermarks. Thus at 207, it is determined whether $I_{filtered}$ is greater than the high load threshold. If it is determined that indeed $I_{filtered}$ is greater than the high load threshold, at 209 the processor load state is set as overloaded.

If $I_{filtered}$ is not greater than the high load threshold, a second determination is made. Specifically at 211, it is determined whether $I_{filtered}$ is greater than the middle load threshold and lower than the high load threshold. If it is determined that indeed $I_{filtered}$ is greater than the middle load threshold and lower than the high load threshold, at 213 the processor load state is set as normal loaded.

If it is determined that $I_{filtered}$ is not greater than the middle load threshold, a third determination is made. Specifically at 215, it is determined whether $I_{filtered}$ is less than the middle load threshold. If it is determined that indeed $I_{filtered}$ is less than the middle load threshold, at 217 the processor load state is set as under loaded.

It should be noted that in FIG. 2, arrows extend from boxes 209, 213, and 214 (where the processing load was set as over loaded, normal loaded or under loaded respectively) back to box 205 where $I_{filtered}$ is determined. This reflects the fact that the determination of $I_{filtered}$ is continuous during digital video data encoding. It should further be noted that the determination of the idle operation d and the instantaneous load value I in boxes 202 and 204 respectively are not static determinations. Rather, the contrary is true and these determinations are continually made and passed to the low pass filter. As will be seen below, the adaptive ESI threshold is adjusted according to ongoing determination of whether the processor load state is over loaded, normal loaded, or under loaded.

Figure 3:
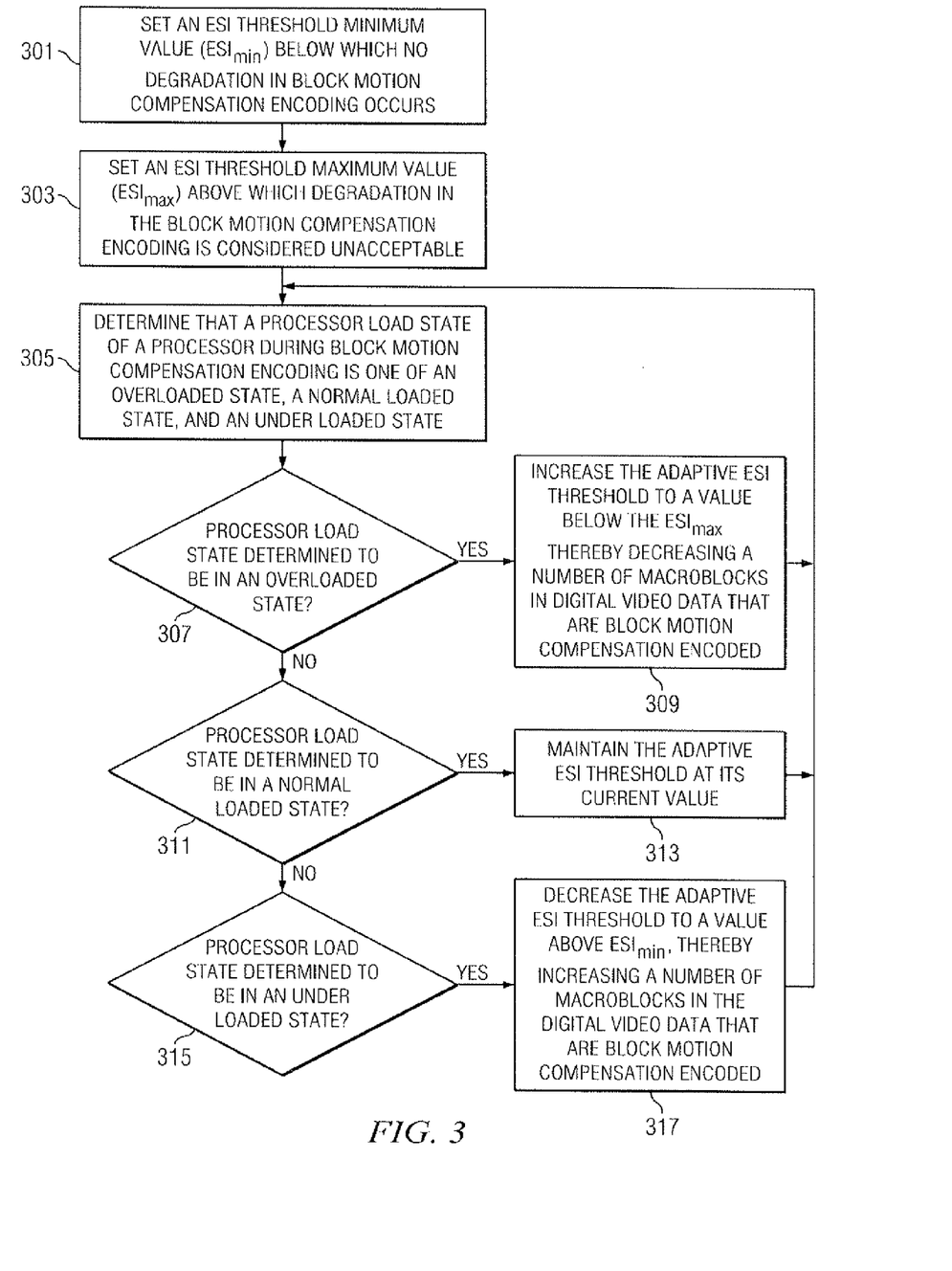
FIG. 3 is a flow chart of a method of determining an adaptive ESI threshold during block motion compensation encoding of digital video data.

Referring now to FIG. 3, a flow chart of a method of determining an adaptive ESI threshold during block motion compensation encoding of digital video data is described and discussed. It should be noted that the method is implemented on an encoding device configured with a processor for performing the block motion compensation encoding. Such encoding devices and process are discussed in more detail below.

As mentioned above, the ESI threshold value determines the number of macroblocks that are skipped macroblocks. That is to say, the larger the ESI threshold, the more macroblocks that are declared as skipped macroblocks. As more macroblocks are determined to be skipped macroblocks, processor load is reduced. As the complement of processor load, quality of the encoded video data is degraded as more macroblocks are determined to be skipped macroblocks.

Logically, the smaller the ESI threshold, the fewer the macroblocks that are declared as skipped macroblocks. As fewer macroblocks are determined to be skipped macroblocks, processor load is increased. As the complement of processor load, quality of the encoded video data is upgraded as fewer macroblocks are determined to be skipped macroblocks.

The method illustrated in FIG. 3 keeps the value of ESI threshold as low as possible while ensuring that the processing load of the processor is not too high. Two constants, an ESI threshold minimum value ($ESI_{min}$) and ESI threshold maximum value ($ESI_{max}$) are defined as part of the method. Below the $ESI_{min}$, the ESI process adds no degradation in encoder processing. Above the $ESI_{max}$, the ESI process degrades the quality of the encoded digital video data to a level that is considered an unacceptable level. Thus at 301, an $ESI_{min}$ is set below which no degradation in block motion compensation encoding occurs. At 303, an $ESI_{max}$ is set above which degradation in the block motion compensation encoding is considered unacceptable.

At 305, it is determined whether a processor load state of the processor during block motion compensation encoding is one of an overloaded state, a normal loaded state, and an under loaded state. As described above with respect to FIG. 1, a circular buffer can be used to determine the processor load state. Additionally, as described above with respect to FIG. 2, a filtered instantaneous load $I_{filtered}$ can be used to determined process load state.

At 307, when it is determined that the processor load state is in an overloaded state, the adaptive ESI threshold is increased at 309 to a value below the $ESI_{max}$. This decreases the number of macroblocks in the digital video data that are block motion compensation encoded. Complementary wise, the processor load is decreased.

If at 307, it is determined that the processor load state is not in an overloaded state, a further determination is made. At 311, when it is determined that the processor load state is a normal loaded state, the adaptive ESI threshold is maintained at 313 at its current value. The number of macroblocks in the digital video data that are block motion compensation encoded remains approximately the same as previously.

If at 311, it is determined that the processor load state is not in a normal loaded state, a further determination is made. At 315, when it is determined that the processor load state is in an under loaded state, the adaptive ESI threshold is decreased at 317 to a value above the $ESI_{min}$. This increases a number of maeroblocks in the digital video data that are block motion compensation encoded. Complementary wise, the processor load is increased.

It should be noted that in FIG. 3, arrows extend from boxes 309, 313, and 317 (where the adaptive ESI threshold is decreased, increased, and maintained respectively) back to box 305 where the processor load state is determined as one of an overloaded state, a normal loaded state, and an under loaded state. This reflects the fact that the determination of processor load state is continuous during digital video data encoding. That is say, the adaptive ESI threshold may be continuously adjusted during encoding.

The manner in which the adaptive ESI threshold is increased or decreased is now described. The ESI threshold is adjusted according to its current value and the distance between the current value and either the $ESI_{min}$ or the $ESI_{max}$. Specifically, when the ESI threshold is increased, the increased ESI threshold ($ESI_{increased}$) is a function of the current ESI threshold ($ESI_{current}$) and $ESI_{max}$. When the ESI threshold is decreased, the decreased ESI threshold ($ESI_{decreased}$) is a function of $ESI_{current}$ and $ESI_{min}$.

Specifically, $ESI_{increased} = (ESI_{current}*\beta) + [(1-\beta)*ESI_{max}]$. Similarly, $ESI_{decreased} = (ESI_{current}*\beta) + [(1-\beta)*ESI_{min}]$. In both cases, $0<\beta<1$. Thus $ESI_{increased}$ and $ESI_{decreased}$ are both smoothed, filtered values. For stability reasons, the constant $\beta$ should be close to 1, and suggested values include ¾, 13/16, ⅞, 15/16, and 31/32.

Figure 4:
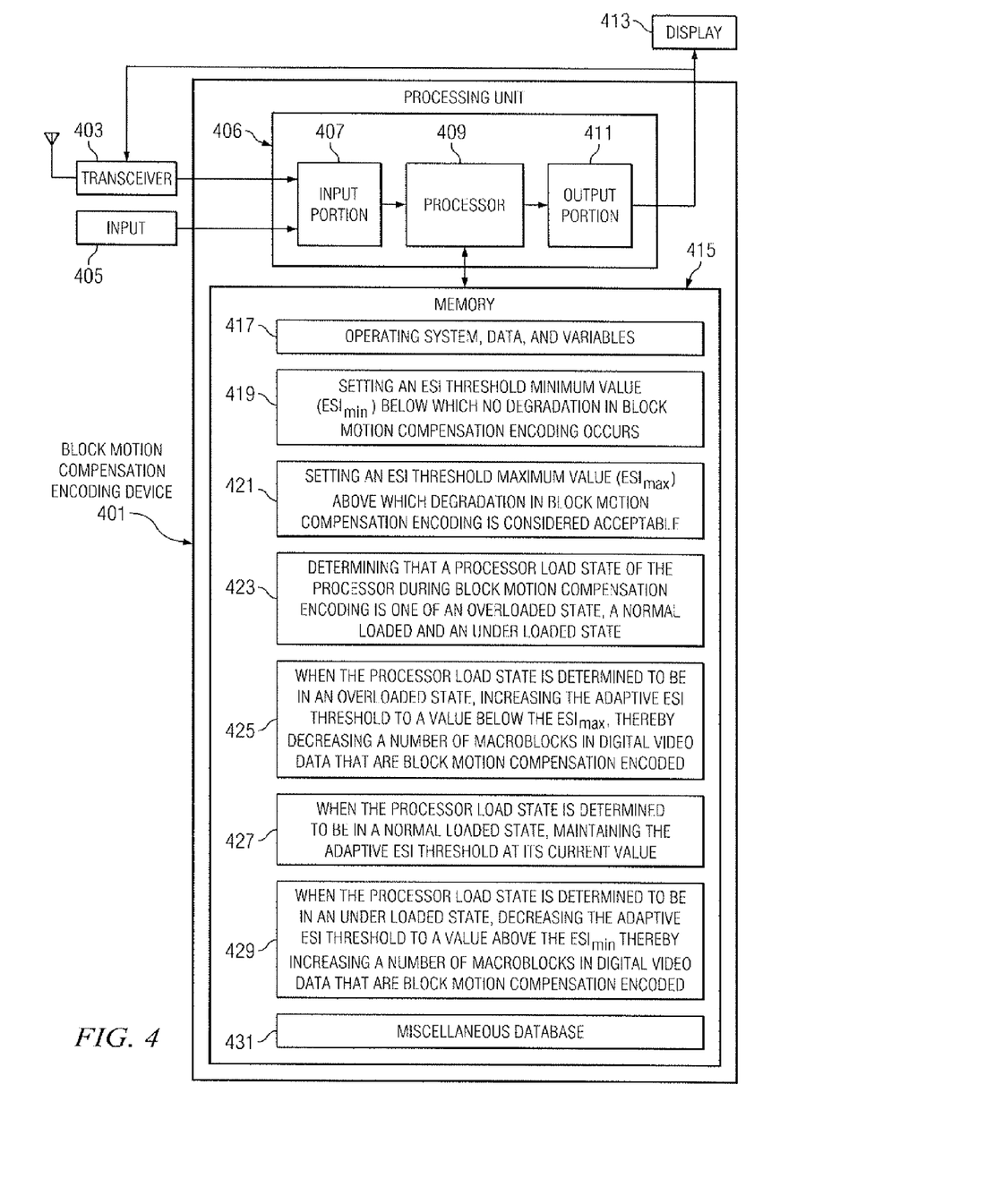
FIG. 4 is a block diagram of a block motion compensation encoding device, including a processor coupled to a memory, the processor executing instructions stored on the memory in order to determine an adaptive ESI threshold during block motion compensation encoding of digital video data.

Referring now to FIG. 4, a block diagram of a block motion compensation encoding device 401 is discussed and described. The block motion compensation encoding device 401 includes a processing unit 406 coupled to a memory 415. The processing unit 406 includes an input portion 407, a processor 409, and an output portion 411. The processor 409 executes instructions stored on the memory 414 in order to determine an adaptive ESI threshold during block motion compensation encoding of digital video data. The processing unit 406 is coupled to, and receives input from, a transceiver 403 and a user input mechanism 405. Further, the processing unit 406 is coupled to, and provides output to, a display 413.

It should be noted that the term block motion compensation encoding device is an identifying label and should be broadly construed to include a variety of different video processing devices. The block motion compensation encoding device 401 is equipped to receive digital data, perhaps wirelessly or from a wired connection or from a tangible digital storage medium, ordinarily associated with a video intended to be coded, compressed, decompressed, decoded, and then displayed for viewing by a viewer. Examples of such units include personal computers, digital television sets, video conferencing systems, personal digital assistants, surveillance systems, cellular handsets or devices, network servers, network gateways, media servers, and digital set up boxes, and equivalents, provided such units are arranged and constructed for video encoding or video transcoding and include video compression.

With respect to the processing unit 406, exemplary embodiments of the processor 409 could include a digital signal processors (DSP), general purpose programmable processor, application specific circuit, a system on a chip (SoC) such as a multi-core processor array, and combinations such as a DSP and a RISC processor together with various specialized programmable accelerators. This list is not intended as being exhaustive. The input portion 407 and output portion 411 may include processor memory and registers that serve to store incoming and outgoing data. Further, they may include analog-to-digital and digital-to-analog converters that provide coupling to analog devices, modulators and demodulators that can provide coupling for transmission waveforms, and packetizers that can provide formats for transmission over networks.

The transceiver 403 is representative of a receiver, a transceiver, a port or other type of connection for wireless or wired communication with a device or peripheral external or internal to the video processing device 401, which receives digital video data which is then processed by the processing unit 406. A user may invoke accessible functions through the user input device 405. The user input device 405 may comprise one or more of various known input devices, such as a keypad, a computer mouse, a touchpad, a touch screen, a trackball, and/or a keyboard. The display 413 may present image data from the processing unit 406 by way of a conventional liquid crystal display (LCD) or other visual display.

The memory 415 is coupled to the processing unit 406, and specifically to the processor 409. The memory 415 may comprise a read-only memory (ROM), a random-access memory (RAM), a programmable ROM (PROM), an electrically erasable read-only memory (EEPROM), and/or a ferroelectric random access memory (FRAM). The memory 415 may be a double data rate (DDR) memory. The memory 415 may include multiple memory locations for storing, among other things, an operating system, data and variables 417 for programs executed by the processor 409. The memory 415 may further include multiple memory locations for storing computer programs 417-429 executed by the processor 409. The memory 415 may further include memory locations for other instructions and/or miscellaneous data 431 that are used by the processor 409.

As mentioned above, the memory 415 may include multiple memory locations for storing computer programs. These computer programs include: setting 419 an ESI threshold minimum value below which no degradation in the block motion compensation encoding occurs; setting 421 an ESI threshold maximum value above which degradation in the block motion compensation encoding is considered unacceptable; determining 423 that a processor load state of the processor during block motion compensation encoding is one of an overloaded state, a normal loaded state, and an under loaded state; when the processor load state is determined to be in an overloaded state, increasing 425 the adaptive ESI threshold to a value below the ESI threshold maximum value thereby decreasing a number of macroblocks in the digital video data that are block motion compensation encoded; when the processor load state is determined to be in a normal loaded state, maintaining 427 the adaptive ESI threshold at its current value; and when the processor load state is determined to be in an under loaded state, decreasing 429 the adaptive ESI threshold to a value above the ESI threshold minimum value thereby increasing a number of macroblocks in the digital video data that are block motion compensation encoded.

Figure 5:
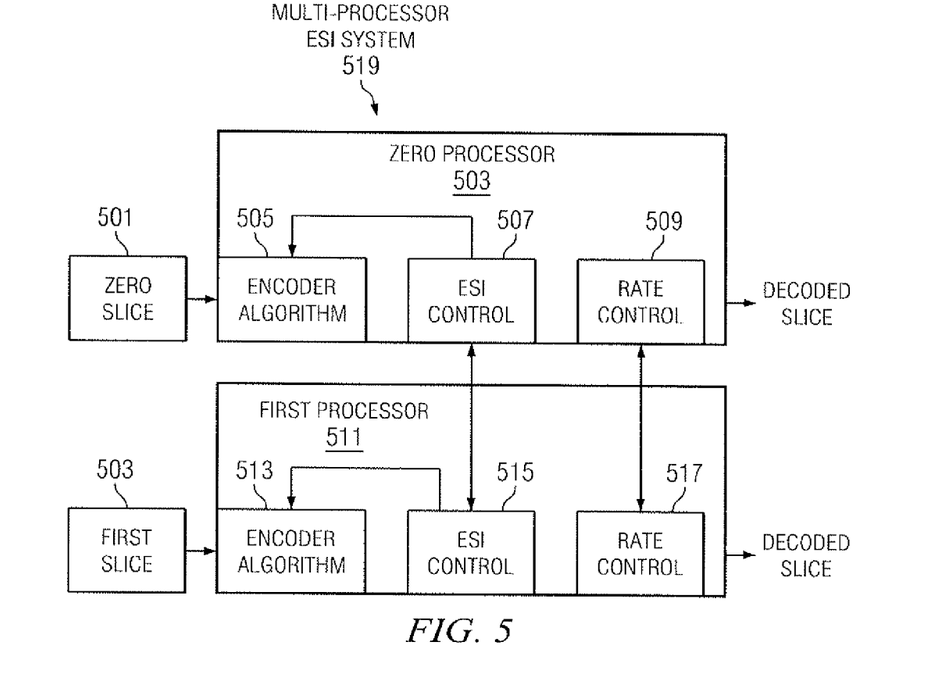
FIG. 5 is a block diagram of a multi-processor system used in determining an adaptive ESI threshold during block motion compensation encoding of digital video data.

Referring to FIG. 5, a block diagram of a multi-processor system used in determining an adaptive ESI threshold during block motion compensation encoding of digital video data is described and discussed. The multi-processor ESI system 519 is a typical multi-processor encoder system. Rather than a single processor encoding a frame at a time, in FIG. 5 zero processor 503 and first processor 511 each processes a slice (a part of) of the frame. For example, zero processor 503 processes zero slice 501 and first processor 511 processes first slice 503. In each of the processors 503, 511, each ESI control 507, 515 feeds ESI information into its respective encoding algorithm 505, 513. An adaptive ESI threshold can therefore be determined in each processor.

It should be quickly noted that more than two processors can be used in any multi-processor ESI system implementing an adaptive ESI encoding process. Two processors are shown in FIG. 5 for simplicity. However, any number of processors could be used, each frame being divided into a number of slices corresponding to the total number of processors.

Each process implemented consumes part of the input data stream so all processors are synchronized. If one processor is in an overload state, it might affect all other processors. Thus in order to achieve optimal quality, the rate control mechanism for a multi-processors system gets information from all processors and generates the same quantization coefficient to all processors.

To ensure a balanced load between the multiple processors, an adaptive ESI threshold encoding process can be implemented in two ways. The first way is to set independent adaptive ESI thresholds in each processor. The second way is to use an adaptive slice size in each processor, but utilize a single adaptive ESI threshold for all the processors.

When an independent adaptive ESI is set in each individual processor, each processor modifies the ESI threshold independent of the other processors in the manner describe above with respect to FIG. 3. However because the slices of a frame are generated randomly, it is conceivable that one processor may be processing a larger load than another processor. For example in FIG. 5, zero processor 503 may have a larger load than first processor 511. The ESI in zero processor 503 may therefore be larger than ESI in first processor 511. However, a global rate control mechanism calculates the system quantization coefficients, ensuring that optimal quality is maintained. This is seen in FIG. 5 as the rate control 509 of zero processor 503 being coupled with rate control 517 of first processor 511.

It should be noted that FIG. 5 is more precisely a multi-processor wherein the adaptive ESI threshold is not independently controlled. This can be seen because the ESI control 507 of zero processor 503 is coupled with the ESI control 515 of first processor 511. To restate, when an independent adaptive ESI threshold is set in each processor, the ESI control in each processor is not coupled with the corresponding processor. When an independent adaptive ESI threshold is set in each processor 503, 511, the line between ESI control 507 and ESI control 515 would be removed.

FIG. 5 thus illustrates the alternative approach of having a single adaptive ESI threshold for all processors in the system. The single adaptive ESI threshold of all processors is a function of the average load of all the processors in the system. When the multiple processors have un-balanced loads, group of lines are moved from the frame slice of the processor with the higher load to the frame slice of the processor with the lower load. Thus rather than adapting the ESI threshold in each processor, the lines of each slice are adapted according to the processor load of each processor. FIG. 5 might more further be illustrated with a coupling of some sort between zero slice 501 and first slice 501 to demonstrate that each slice can be adjusted or adapted according to processor load.

Experimental results of a single processor encoder programmed to operate in accord with principles of disclosed embodiments herein are now discussed. Three digital video clips were used to compare performances. Clip 1 and clip 2 was recorded with a resolution of 720 by 480 pixels. Clip 3 was recorded with a resolution of 720 by 576 pixels. The encoder was configured to process 1.5 million bits per second (Mbps), 2 Mbps and 10 Mbps. Amer each run a JM decoder decoded the resulting compressed clip back to the YUV domain. A standard peak signal to noise ration (PSNR) algorithm was used to determine the PSNR.

The adaptive ESI method was compared to a system without ESI and to an alternative early ESI implementation based on cost function considerations. The code was executed on a 625 MhZ DSP. To achieve real-time video display, average cycles per frame should be less than 625/30=20.83M for the 720 by 480 resolution clips, and 25M for the 720 by 576 resolution clips. Table 1 below shows the PSNR and the recorded cycle count of the three methods:

TABLE 1

| Clip | Model | 1.5M Mbps | | 2M Mbps | | 10M Mbps | |
| | | PSNR | Million Cycles | PSNR | Million Cycles | PSNR | Million Cycles |
| --- | --- | --- | --- | --- | --- | --- | --- |
| Clip1 (720 × 480) | No ESI | 35.59 | 28.76 | 36.85 | 29.37 | 43.7 | 34.73 |
| Clip1 (720 × 480) | Adaptive ESI | 35.49 | 21.95 | 36.26 | 22.18 | 38.98 | 25.57 |
| Clip1 (720 × 480) | Cost Based Algorithm | 35.76 | 25.38 | 36.9 | 25.6 | 43.7 | 34.73 |
| Clip2 (720 × 480) | No ESI | 44.79 | 26.6 | 45.86 | 27.2 | 52.82 | 31.6 |
| Clip2 (720 × 480) | Adaptive ESI | 44.33 | 17.92 | 45.11 | 17.99 | 45.75 | 18.23 |
| Clip2 (720 × 480) | Cost Based Algorithm | 43.66 | 19.69 | 44.4 | 20.03 | 52.82 | 31.6 |
| Clip3 (720 × 576) | No ESI | 45.64 | 29.75 | 46.88 | 30.01 | 57.61 | 34.32 |
| Clip3 (720 × 576) | Adaptive ESI | 45.24 | 18.07 | 46.34 | 18.27 | 51.69 | 17.98 |
| Clip3 (720 × 576) | Cost Based Algorithm | 44.93 | 22.54 | 46.88 | 29.99 | 57.61 | 34.3 |

Table 1 clearly demonstrates that no matter the resolution and no matter the number of bits executed per second, the use of the adaptive ESI threshold results in a lower PSNR and a lower count cycle. The embodiments disclosed herein thus increase efficiency and increase quality in block motion compensation encoding over the prior art and over alternative solutions. Some terms used in this disclosure are now defined.

The term "delay buffer" is used herein to indicate a region of memory used to temporarily hold data. The data is stored in the region of memory as it is retrieved from an input device before being processed and sent to an output device.

The term "digital video data" is used herein to indicate digital video data that is un-processed, i.e., before processing, compression and the like, and generally will be processed row-by-row in one still image, frame, or picture of a video which includes many still images, frames, or pictures to compose the complete video. Digital video data can be pixels, for example, in YUV format, variants and evolutions thereof.

The term "frame" is used herein to indicate the information representing just one of many still images which compose a complete video, and which can be represented as an array of picture elements (for example, color and luminance) and/or motion vectors, as may be further defined in standards such as MPEG1/2/4/7/H.264/VC-1/AVS, variants and evolutions thereof.

The term "macroblock" is used herein to indicate a region of predefined size within a frame, sometimes called a "mblock", and is typically 16×16 grouping of pixels, as may be further defined in standards such as MPEG1/2/4/7/H.264/VC-1/AVS, variants and evolutions thereof.

The term "processor load" is used herein to indicate the amount of work that a processor performs.

The term "processor load state" is used herein to indicate a state of the processor considering whether the processor is performing more, less, or the same amount of work than usual over an average period of time.

The term "skipped macroblock" is used herein to indicate a macroblock for which processing can be bypassed because the bits can be deduced from previous and/or subsequent macroblocks.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of determining an adaptive early skip indication (ESI) threshold during block motion compensation encoding of digital video data, implemented on an encoding device configured with a processor for performing the block motion compensation encoding, comprising:

setting an ESI threshold minimum value ($ESI_{minimum}$) below which no degradation in the block motion compensation encoding occurs;

setting an ESI threshold maximum value ($ESI_{maximum}$) above which degradation in the block motion compensation encoding is considered unacceptable;

determining that a processor load state of the processor during block motion compensation encoding is one of an overloaded state, a normal loaded state, and an under loaded state comprising:

setting a high load threshold;

setting a middle load threshold;

determining a filtered instantaneous load value ($I_{filtered}$);

when $I_{filtered}$ is determined to be greater than the high load threshold, setting the processor load state as overloaded and increasing the adaptive ESI threshold comprising increasing a current valued ($ESI_{current}$) of the adaptive ESI threshold to an increased value ($ESI_{increased}$) of the adaptive ESI threshold according to the formula, $ESI_{increased}=(ESI_{current}*\beta)+[(1-\beta)*ESI_{maximum}]$;

when $I_{filtered}$ is determined to be between the middle load threshold and the high load threshold, setting the processor load state as normal loaded and maintaining the adaptive ESI threshold at its current value; and when $I_{filtered}$ is determined to be less than the middle load threshold, setting the processor load state as under loaded and decreasing the adaptive ESI threshold comprising decreasing $ESI_{current}$ to a decreased value ($ESI_{decreased}$) of the adaptive ESI threshold according to the formula, $ESI_{decreased}=(ESI_{current}*\beta)+[(1-\beta)*ESI_{minimum}]$, and $0<\beta<1$.

2. A method of determining an adaptive early skip indication (ESI) threshold during block motion compensation encoding of digital video data, implemented on an encoding device configured with a processor for performing the block motion compensation encoding, comprising:

setting an ESI threshold minimum value ($ESI_{minimum}$) below which no degradation in the block motion compensation encoding occurs;

setting an ESI threshold maximum value ($ESI_{maximum}$) above which degradation in the block motion compensation encoding is considered unacceptable;

determining that a processor load state of the processor during block motion compensation encoding is one of an overloaded state, a normal loaded state, and an under loaded state comprising:

setting a high load threshold;

setting a middle load threshold;

determining a filtered instantaneous load value $I_{filtered}$ according to the formula, $I_{filtered}=(\alpha*I_{filtered})+[(1-\alpha)*I]$, I being an instantaneous load value set at 100-d, where d is a percentile of idle operation of the processor, and $0<\alpha<1$;

when $I_{filtered}$ is determined to be greater than the high load threshold, setting the processor load state as overloaded and increasing the adaptive ESI threshold to a value below the ESI threshold maximum value thereby decreasing a number of macroblocks in the digital video data that are block motion compensation encoded;

when $I_{filtered}$ is determined to be between the middle load threshold and the high load threshold, setting the processor load state as normal loaded and maintaining the adaptive ESI threshold at its current value; and when $I_{filtered}$ is determined to be less than the middle load threshold, setting the processor load state as under loaded and decreasing the adaptive ESI threshold to a value above the ESI threshold minimum value thereby increasing a number of macroblocks in the digital video data that are block motion compensation encoded.

3. The method according to claim 2, wherein
the high load threshold is set in the range of 95-99 percentile; and
the middle load threshold is in the range of 85-95 percentile.

4. The method according to claim 2, wherein the values of α is set at one of ⅞, ¹⁵⁄₁₆, ¹³⁄₁₆ and ¾.

5. A method of determining an adaptive early skip indication (ESI) threshold during block motion compensation encoding of digital video data, implemented on an encoding device configured with a processor for performing the block motion compensation encoding, comprising:
setting an ESI threshold minimum value ($ESI_{minimum}$) below which no degradation in the block motion compensation encoding occurs;
setting an ESI threshold maximum value ($ESI_{maximum}$) above which degradation in the block motion compensation encoding is considered unacceptable;
determining that a processor load state of the processor is one of an overloaded state, a normal loaded state, and an under loaded state comprising:
streaming frames of digital video data to be block motion compensation encoded into a circular delay buffer;
delaying the start of block motion compensation encoding by the processor until a threshold number of frames are stored in the circular delay buffer;
when a total number of frames stored in the circular delay buffer is greater than the threshold number of frames, setting the processor load state as overloaded, and increasing the adaptive ESI threshold to a value below the ESI threshold maximum value thereby decreasing a number of macroblocks in the digital video data that are block motion compensation encoded;
when the total number of frames stored in the circular delay buffer is equal to the threshold number of frames, setting the processor load state as normal loaded, and maintaining the adaptive ESI threshold at its current value; and
when the total number of frames stored in the circular delay buffer is less than the threshold number of frames, setting the processor load state as under loaded and decreasing the adaptive ESI threshold to a value above the ESI threshold minimum value thereby increasing a number of macroblocks in the digital video data that are block motion compensation encoded.

6. The method of claim 5, the encoding device configured with a processor for performing block motion compensation encoding being further configured with an additional processor such that the processor and the additional processor perform block motion compensation encoding on different slices of the digital video data, further comprising:
determining an independent adaptive early skip indication threshold for the additional processor during the block motion compensation encoding.

7. The method of claim 5, wherein the encoding device configured with a processor for performing block motion compensation encoding is further configured with an additional processor such that the processor and the additional processor perform block motion compensation encoding on different slices of the digital video data, further comprising:
determining a load balance among the processor and the additional processor; and
transferring block motion compensation encoding of a portion of macroblocks in one of the slices of the digital video data to the additional processor according to the load balance among the processor and the additional processor.

8. A non-transitory computer-readable medium with instructions stored thereon, that when executed by a processor performing block motion compensation encoding of digital video data, perform a method of determining an adaptive early skip indication (ESI) threshold comprising:
setting an ESI threshold minimum value ($ESI_{minimum}$) below which no degradation in the block motion compensation encoding occurs;
setting an ESI threshold maximum value ($ESI_{maximum}$) above which degradation in the block motion compensation encoding is unacceptable;
determining that a processor load state of the processor during block motion compensation encoding is one of an overloaded state, a normal loaded state, and an under loaded state, comprising:
setting a high load threshold;
setting a middle load threshold;
determining a filtered instantaneous load value filtered when $I_{filtered}$ is determined to be greater than the high load threshold, value, setting the processor load state as overloaded and increasing the adaptive ESI threshold comprising increasing a current value ($ESI_{current}$) of the adaptive ESI threshold to an increased value ($ESI_{increased}$) of the adaptive ESI threshold according to the formula, $ESI_{increased} = (ESI_{current}*\beta) + [(1-\beta)*ESI_{maximum}]$;

when $I_{filtered}$ is determined to be between the middle load threshold and the high load threshold, setting the processor load state as normal loaded and maintaining the adaptive ESI threshold at its current value; and
when $I_{filtered}$ is determined to be less than the middle load threshold, setting the processor load state as under loaded and decreasing the adaptive ESI threshold comprising decreasing $ESI_{current}$ to a decreased value ($ESI_{decreased}$) of the adaptive ESI threshold according to the formula, $ESI_{decreased} = (ESI_{current}*\beta) + [(1-\beta)*ESI_{minimum}]$, and $0 < \beta < 1$.

9. A non-transitory computer-readable medium with instructions stored thereon, that when executed by a processor performing block motion compensation encoding of digital video data, perform a method of determining an adaptive early skip indication (ESI) threshold comprising:
setting an ESI threshold minimum value ($ESI_{minimum}$) below which no degradation in the block motion compensation encoding occurs;
setting an ESI threshold maximum value ($ESI_{maximum}$) above which degradation in the block motion compensation encoding is unacceptable;
determining that a processor load state of the processor during block motion compensation encoding is one of an overloaded state, a normal loaded state, and an under loaded state, comprising:
setting a high load threshold;
setting a middle load threshold;
determining a filtered instantaneous load value $I_{filtered}$ according to the formula, $I_{filtered} = (\alpha*I_{filtered}) + [(1-\alpha)*I]$, I being an instantaneous load value set at 100-d, where d is a percentile of idle operation of the processor, and $0<\alpha<1$;

when $I_{filtered}$ is determined to be greater than the high load threshold, value, setting the processor load state as overloaded and increasing the adaptive ESI threshold to a value below the ESI threshold maximum value thereby decreasing a number of macroblocks in the digital video data that are block motion compensation encoded;

when $I_{filtered}$ is determined to be between the middle load threshold and the high load threshold, setting the processor load state as normal loaded and maintaining the adaptive ESI threshold at its current value; and when $I_{filtered}$ is determined to be less than the middle load threshold, setting the processor load state as under loaded and decreasing the adaptive ESI threshold to a value above the ESI threshold minimum value thereby increasing a number of macroblocks in the digital video data that are block motion compensation encoded.

10. The non-transitory computer-readable medium according to claim 9, wherein the high load threshold is set in the range of 95-99 percentile;

the middle load threshold is in the range of 85-95 percentile, and the values of $\alpha$ is set at one of $7/8$, $15/16$, $13/16$ and $3/4$.

11. A processing unit for use in a block motion compensation encoding device, comprising:

an input portion that accepts as input digital video data;

a processor that performs block motion compensation encoding on the digital video data accepted by the input portion, and determines an adaptive early skip indication (ESI) threshold during the block motion compensation encoding; and an output portion that outputs block motion compensation encoded digital video data from the processor, wherein the processor determines the adaptive ESI threshold by:

setting an ESI threshold minimum value ($ESI_{minimum}$) below which no degradation in the block motion compensation encoding occurs;

setting an ESI threshold maximum value ($ESI_{maximum}$) above which degradation in the block motion compensation encoding is unacceptable;

determining that a processor load state of the processor during block motion compensation encoding is one of an overloaded state, a normal loaded state, and an under loaded state, comprising:

setting a high load threshold;

setting a middle load threshold;

determining a filtered instantaneous load value ($I_{filtered}$);

when $I_{filtered}$ is determined to be greater than the high load threshold, value, setting the processor load state as overloaded and increasing the adaptive ESI threshold comprising increasing a current valued ($ESI_{current}$) of the adaptive ESI threshold to an increased value ($ESI_{increased}$) of the adaptive ESI threshold according to the formula, $ESI_{increased}=(ESI_{current}*\beta)+[(1-\beta)*ESI_{maximum}]$;

when $I_{filtered}$ is determined to be between the middle load threshold and the high load threshold, setting the processor load state as normal loaded and maintaining the adaptive ESI threshold at its current value; and when $I_{filtered}$ is determined to be less than the middle load threshold, setting the processor load state as under loaded and decreasing the adaptive ESI threshold comprising decreasing $ESI_{current}$ to a decreased value ($ESI_{decreased}$) of the adaptive ESI threshold according to the formula, $ESI_{decreased}=(ESI_{current}*\beta)+[(1-\beta)*ESI_{minimum}]$, and $0<\beta<1$.

12. A processing unit for use in a block motion compensation encoding device, comprising:

an input portion that accepts as input digital video data;

a processor that performs block motion compensation encoding on the digital video data accepted by the input portion, and determines an adaptive early skip indication (ESI) threshold during the block motion compensation encoding; and an output portion that outputs block motion compensation encoded digital video data from the processor, wherein the processor determines the adaptive ESI threshold by:

setting an ESI threshold minimum value ($ESI_{minimum}$) below which no degradation in the block motion compensation encoding occurs;

setting an ESI threshold maximum value ($ESI_{maximum}$) above which degradation in the block motion compensation encoding is unacceptable;

determining that a processor load state of the processor during block motion compensation encoding is one of an overloaded state, a normal loaded state, and an under loaded state, comprising:

setting a high load threshold;

setting a middle load threshold;

determining a the filtered instantaneous load value $I_{filtered}$ is determined according to the formula, $I_{filtered}=(\alpha*I_{filtered})+[(1-\alpha)*I]$, I being an instantaneous load value set at 100-d, where d is a percentile of idle operation of the processor, and $0<\alpha<1$ when $I_{filtered}$ is determined to be greater than the high load threshold, value, setting the processor load state as overloaded and increasing the adaptive ESI threshold to a value below the ESI threshold maximum value;

when $I_{filtered}$ is determined to be between the middle load threshold and the high load threshold, setting the processor load state as normal loaded and maintaining the adaptive ESI threshold at its current value; and when $I_{filtered}$ is determined to be less than the middle load threshold, setting the processor load state as under loaded and decreasing the adaptive ESI threshold to a value above the ESI threshold minimum value.

13. The processing unit according to claim 12, wherein the high load threshold is set in the range of 95-99 percentile; and the middle load threshold is in the range of 85-95 percentile.

14. The processing unit according to claim 12, wherein the values of $\alpha$ is set at one of $7/8$, $15/16$, $13/16$ and $3/4$.

* * * * *